US011752867B2

(12) United States Patent
Erwin et al.

(10) Patent No.: US 11,752,867 B2
(45) Date of Patent: Sep. 12, 2023

(54) DEVICE FOR REVVING AN ENGINE OF A VEHICLE

(71) Applicant: BG Intellectuals, Inc., Wichita, KS (US)

(72) Inventors: Michael Jason Erwin, Augusta, KS (US); Thomas Michael Probus, Wichita, KS (US); John Daniel Cheek, Wichita, KS (US); Lucas Mitchell Shaw, Wichita, KS (US); Bradley Robert Young, Wichita, KS (US)

(73) Assignee: BG INTELLECTUALS, INC., Wichita, KS (US)

( * ) Notice: Subject to any disclaimer, the term of this patent is extended or adjusted under 35 U.S.C. 154(b) by 207 days.

(21) Appl. No.: 16/845,814

(22) Filed: Apr. 10, 2020

(65) Prior Publication Data

US 2020/0324650 A1    Oct. 15, 2020

Related U.S. Application Data

(60) Provisional application No. 62/834,033, filed on Apr. 15, 2019.

(51) Int. Cl.
*B60K 26/04*    (2006.01)
*B60S 5/00*    (2006.01)
(Continued)

(52) U.S. Cl.
CPC ............ *B60K 26/04* (2013.01); *B60R 16/023* (2013.01); *B60S 5/00* (2013.01); *B62D 1/06* (2013.01);
(Continued)

(58) Field of Classification Search
None
See application file for complete search history.

(56) References Cited

U.S. PATENT DOCUMENTS 5,809,833 A * 9/1998 Newport ................. F16H 25/20
74/89.41
5,991,674 A    11/1999 Froelich et al.
(Continued)

FOREIGN PATENT DOCUMENTS

FR    2 793 204 A1    11/2000
FR    2 893 550 A3    5/2007

OTHER PUBLICATIONS

Actuonix Motion Devices—10 Different Options for Controlling Linear Actuators (https://web.archive.org/web/20170606084322/http://blog.actuonix.com/2017/05/10-different-options-for-controlling. html, posted May 4, 2017) (Year: 2017).*
(Continued)

*Primary Examiner* — James J Lee
*Assistant Examiner* — David Hatch
(74) *Attorney, Agent, or Firm* — SHOOK, HARDY & BACON LLP

(57) ABSTRACT

Revving an engine may be helpful in various contexts, such as when servicing the vehicle. For example, in some types of services, a cleaning agent may be introduced into the intake and surrounding regions of an engine, and the engine may be revved to reduce a likelihood that the cleaning agent might puddle. In some instances, a device can be positioned within a vehicle interior and can be used to automatically rev the vehicle engine by depressing on the vehicle throttle. In other examples, an engine revving device may send a signal to an electronic-controlled throttle actuator.

18 Claims, 4 Drawing Sheets

(51) Int. Cl.
  *B60R 16/023*   (2006.01)
  *G07C 5/08*    (2006.01)
  *B62D 1/06*    (2006.01)
(52) U.S. Cl.
  CPC ......... *G07C 5/085* (2013.01); *G07C 2205/02* (2013.01)

(56) References Cited

U.S. PATENT DOCUMENTS

| | | | | |
|---|---|---|---|---|
| 6,632,506 | B1* | 10/2003 | Grail | G02B 5/128 |
| | | | | 428/141 |
| 9,886,053 | B1* | 2/2018 | Buse | B60T 7/042 |
| 2011/0100105 | A1 | 5/2011 | Bauerle et al. | |
| 2012/0187358 | A1 | 7/2012 | Lee | |
| 2013/0226394 | A1* | 8/2013 | Amirpour | G01M 17/007 |
| | | | | 701/31.4 |
| 2015/0336557 | A1* | 11/2015 | McNeil, Sr. | B60T 17/223 |
| | | | | 254/104 |
| 2019/0135260 | A1* | 5/2019 | Graves | B60T 17/223 |

OTHER PUBLICATIONS

Yang et al, Machine translation of foreign patent document KR 101773836 B1 (Year: 2016).*
International Search Report and Written Opinion received for PCT Patent Application No. PCT/US2020/028130, dated Aug. 31, 2020, 12 pages.
International Preliminary Report on Patentability received for PCT Application No. PCT/US2020/028130, dated Oct. 28, 2021, 9 pages.

* cited by examiner

DEVICE FOR REVVING AN ENGINE OF A VEHICLE

CROSS-REFERENCE TO RELATED APPLICATIONS

This application claims priority to U.S. Provisional Application No. 62/834,033 (filed Apr. 15, 2019), which is incorporated herein by reference in its entirety.

TECHNICAL FIELD

This disclosure relates to a device that revs a vehicle, such as when the vehicle is being serviced.

BACKGROUND

During induction services for an engine, an agent (e.g., liquid cleaner) is introduced through an intake and moved or flowed across different engine components. For example, the engine may be revved to propel the agent across cylinders. Proper revving (e.g., every 45 seconds for 25 to 40 minutes) may improve the effectiveness of the service and avoid negatively impacting performance of the engine (e.g., such as by avoiding negative issues associated with hydrolocking). However, revving can limit a shop technician's ability to perform other tasks and is prone to human error.

BRIEF DESCRIPTION OF THE DRAWINGS

The subject matter of this disclosure is described in detail herein with reference to the figures that are listed directed below and that are incorporated herein by reference. These figures are submitted together with this disclosure.

DETAILED DESCRIPTION

Figure 1:
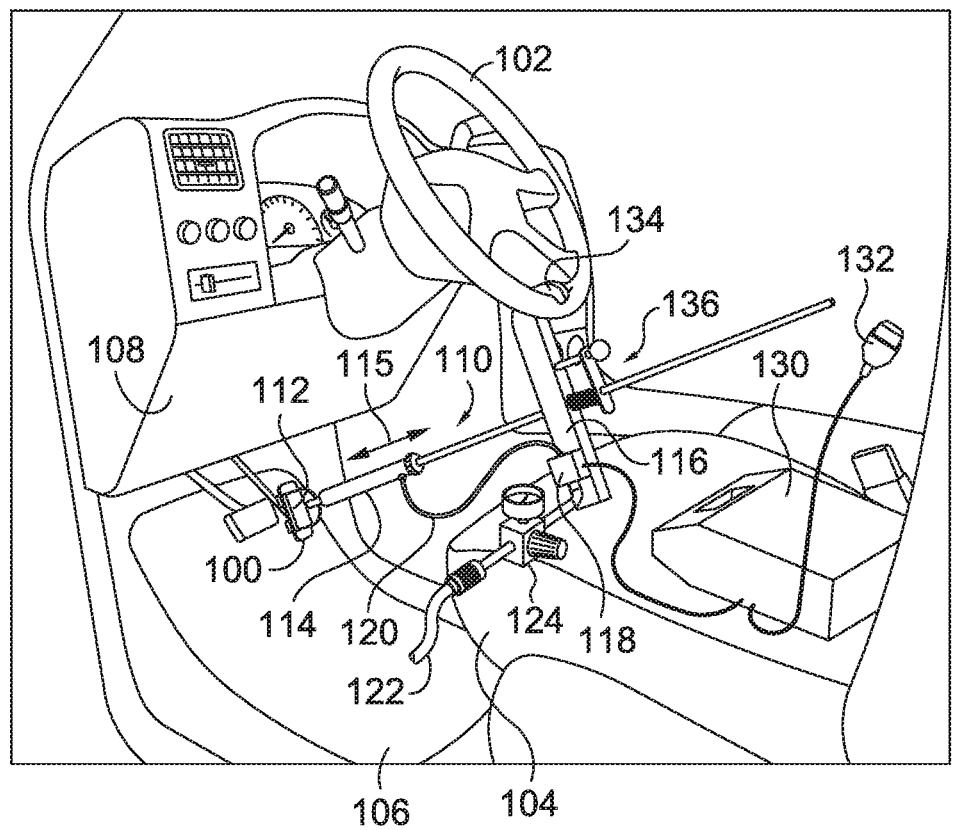
FIG. 1 depicts an example engine revving device including a throttle depressor positioned in a vehicle interior in accordance with an aspect of this disclosure.

Subject matter is described throughout this Specification in detail and with specificity in order to meet statutory requirements. But the aspects described throughout this Specification are intended to be illustrative rather than restrictive, and the description itself is not intended necessarily to limit the scope of the claims. Rather, the claimed subject matter might be practiced in other ways to include different elements or combinations of elements that are similar to the ones described in this Specification and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

At a high level, this disclosure describes a device that revs a vehicle engine, such as when the vehicle is being serviced. That is, the vehicle may include a propulsion system (e.g., an internal combustion engine, hybrid electric power plant, an all-electric engine, and/or another propulsion system type) connected to a drive train of the vehicle. The propulsion system may be controlled in response to receiving signals from various sources, such as a manually-controlled, pedal-type throttle/accelerator or an electronic-controlled throttle actuator. In one aspect of the present disclosure, the engine revving device may be positioned within a vehicle interior and used to automatically rev the vehicle engine by pressing the vehicle throttle pedal. In another example, the engine revving device may electronically connect to the electronic-controlled throttle actuator (e.g., via OBD 2 port or on-board engine revving module) to send signals for activating or deactivating the propulsion system.

As used in this disclosure, the terms "rev" or "revving" refers to the operation of temporarily activating a throttle (e.g., depressing vehicle gas pedal) and then deactivating the throttle to allow the throttle to return to an original (e.g., at-rest) position. Furthermore, as used in this disclosure, the term "auto-revving" refers to a situation in which a non-human operator executes the activation of, and deactivating of, the pedal. Auto-revving includes a partially-automated system, such as where a human operator (e.g., shop technician) may operate a switch, which triggers activation of the throttle, as well as a fully-automated system in which the device is fully programmable to execute the throttle activation without a human operator controlling the trigger. Auto-revving may be executed in various scenarios, such as when the vehicle is being serviced. For example, in some types of services, a cleaning agent may be introduced into the intake and surrounding regions of an engine, and the engine may be revved to reduce a likelihood that the cleaning agent might puddle. Absent subject matter of this disclosure, a shop technician might sit in the vehicle and manually rev the vehicle at selected intervals. As such, the subject matter of this disclosure improves efficiency and effectiveness of the service by permitting the revving to occur at more precisely controlled intervals and by freeing a human shop technician to perform other tasks.

Referring now to FIG. 1, an example of an engine revving device 110 is depicted, and for illustrative purposes, the engine revving device 110 is shown installed or positioned in the interior of a vehicle. The vehicle includes, among other things, a throttle pedal 100, a steering wheel 102, a seat 104, a floorboard 106, and a console 108.

In an aspect of this disclosure, the engine revving device 110 generally includes a throttle-pedal connector 112, a linear actuator 114, a throttle-depressor base 116, and a linear-actuator controller (e.g., elements 118 and 130). At a high level, the throttle-pedal connector 112 is attachable to the throttle pedal 100, and the linear actuator 114 is coupled with the throttle-pedal connector 112. Furthermore, the throttle-depressor base 116 is coupled to the linear actuator 114 and fixes a relative position of the engine revving device 110 in the vehicle. The linear-actuator controller controls an operation of the linear actuator 112 by activating the linear actuator 112 between a retracted state and an extended state (as illustrated by arrow 115). Because the throttle-depressor base 116 fixes the relative position of the engine revving device 110 inside the vehicle, when the linear actuator 112 moves to the extended state, the throttle-pedal connector 112 in-turn depresses the throttle pedal 100 to rev the vehicle engine. Furthermore, when the linear actuator 112 is deactivated (e.g., retracted), the throttle pedal 100 returns to the original (e.g., at rest) position.

The throttle-pedal connector 112 may include various elements. For example, in one aspect of this disclosure, the throttle-pedal connector 112 includes an adjustable clamp. The adjustable clamp may frictionally engage various portions of the throttle pedal 100. For example, the adjustable clamp may adjustably open and close to frictionally engage one or both sides of the throttle pedal 100, the front and/or back of the throttle pedal 100, or any and all combinations thereof. In another aspect, the throttle-pedal connector 112 may include an adjustable strap that can be wrapped around at least a portion of the throttle pedal 100 to releasably attach to the throttle pedal 100. In yet another aspect, the throttle-pedal connector 112 includes a surface that faces towards the direction in which the linear actuator 114 moves when transitioning to an extended state (i.e., facing away from the throttle-depressor base 116 and towards the throttle pedal 100) and that is configured to mechanically adhere to the throttle pedal 100. For example, a rubberized surface may be configured to mechanically adhere to the throttle pedal 100, such that when the throttle depressor is activated, the rubberized surface frictionally engages the throttle pedal 100. The rubberized surface (or other surface configured to mechanically adhere) may include surface features, such as tread elements, that aid with engaging the throttle pedal 100.

The linear actuator 114 may also include various elements. For example, in one aspect of the disclosure, the linear actuator 114 includes a pneumatic cylinder. As depicted in FIG. 1, the pneumatic cylinder is coupled to a compressed air source by way of air hoses 120 and 122. The compressed air source (not depicted) may include a stand-alone compressor, shop air, or the like. Furthermore, a pressure valve 124 may be installed along the line in order to control the air pressure supplied to the pneumatic cylinder. Although FIG. 1 depicts a pneumatic cylinder, the linear actuator 114 may include alternative devices. For example, the linear actuator might include a hydraulic cylinder, electric linear actuator (e.g., servo motor), or the like.

As previously mentioned, the engine revving device 110 also includes a linear-actuator controller, which may include various elements. For example, in one aspect, the linear-actuator controller includes a solenoid valve 118, which can be selectively opened to permit compressed fluid to flow to the linear actuator 114 or can be selectively closed to block fluid flow to the linear actuator 114. The solenoid valve 118 may be controlled by various electrical switches. For example, the solenoid valve 118 may be controlled by a programmable timer that temporarily opens the solenoid valve 118 at predetermined intervals. In another example, the solenoid valve 118 may be controlled by a human-operated electrical switch, in which case a human operator (e.g., shop technician) can manually turn the switch on or off at selected intervals.

In FIG. 1, the linear-actuator controller includes a programmable controller 130 that is electronically coupled with the solenoid 118. The programmable controller 130 includes a timer that is programmable to set one or more predetermined intervals. For example, the programmable controller 130 might include a programmable logic controller, or other computing device, to permit programmatic control of the timer. As such, the controller 130 can be programmed to selectively and temporarily open the solenoid 118 at predetermined intervals, which in turn temporarily depresses the throttle 100 to rev the engine. For example, when a vehicle is undergoing some types of services (e.g., induction cleaning service), it might be desirable to rev the engine about every 45 seconds. This is just an example, and the timer can be selectively programmed to include different intervals based on the service or use of the throttle depressor.

The programmable controller 130 also includes a power source, and in one aspect, the power source includes an on-board diagnostics connector 132 (i.e., connector or plug that mates with the OBD-II port). In other aspects, the programmable controller 130 may be powered from other sources, such as an auxiliary port, USB port, 12V plug, etc. The OBD2 connector 132 may be configured to receive power, as well as data, from the vehicle. As such, in a further aspect, the programmable controller 130 includes a computing device having a processor configured to communicate with a motor-vehicle diagnostics system, such that the programmable controller 130 is configured to receive input data from the motor-vehicle diagnostics system by way of the OBD2 connector 132.

In a further aspect, the processor is configured to automatically adjust the one or more set intervals in response to receiving the input data. The one or more set intervals may be adjusted in response to various data, including any metrics that might be broadcast by the vehicle over the OBD2 sensor or through other means (e.g., RPM, temperature, current gear, run time, or any and all combinations thereof). In other words, the engine revving device 110 may execute a first revving cycle at a first interval (e.g., 45 seconds), and the programmable controller 130 may adjust the subsequent timing of a second revving cycle based on data received from the vehicle-diagnostics system. The programmable controller 130 might adjust the time between cycles, the duration of linear-actuator activation and pedal depression, the extent to which the solenoid valve is opened, or any combination thereof.

The programmable controller 130 may have the ability to read other data from the vehicle and adjust operations accordingly. For example, the programmable controller 130 may include failsafe features. In one aspect, the programmable controller 130 may read engine temperatures or catalytic converter temperatures and modify operations to avoid overheating. In other instances, these temperatures may be read to ensure that they are in a desired range optimal for servicing. In a further example, the programmable controller 130 may read a transmission status to confirm that the vehicle is in "park" before revving is initiated.

The throttle-depressor base 116 fixes a relative position of the engine revving device 110 inside the vehicle interior. As such, when the linear actuator 114 is activated, the throttle connector 112 depresses the throttle pedal 100, as opposed to the linear actuator 114 moving away from the throttle pedal 100. In order to fix the relative position, a connection of the throttle-depressor base 116 is strong enough to overcome a return force of the throttle pedal 100. In one aspect, the throttle-depressor base 116 releasably attaches to a portion of a vehicle. For example, the throttle-depressor base 116 may include an adjustable clamp (e.g., 134) for attachment to the portion of the vehicle. As depicted in FIG. 1, the throttle-depressor base 116 may releasably attach to the steering wheel 102. In other aspects, the throttle-depressor base 116 may releasably attach to the seat 104 or seat frame or console 108. In yet another aspect, the throttle-depressor base comprises a weighted base that rests on a floorboard 106 of a vehicle and that is heavy enough to overcome the return force of the throttle pedal 100.

In a further aspect, the engine revving device 110 includes a length adjuster 136 that adjusts a distance between the throttle-depressor base 116 and the throttle-pedal connector 112. In other words, different vehicles will include different dimensions and distances between the throttle pedal 100 and the portion of the vehicle to which the throttle-depressor base 116 attaches (e.g., the steering wheel 102 in FIG. 1). As such, the length adjuster 136 selectively adjusts the throttle-depressor base 116 to be either closer to or farther from the throttle-pedal connector 112. In one aspect, the length adjuster 136 includes a threaded connector (e.g., worm drive or other threaded rod that engages the base 116) that can be turned in a first direction to increase the distance between the throttle-depressor base 116 and the throttle-pedal connector 112 and that can be turned in a second, opposite direction to decrease the distance.

Figure 2:
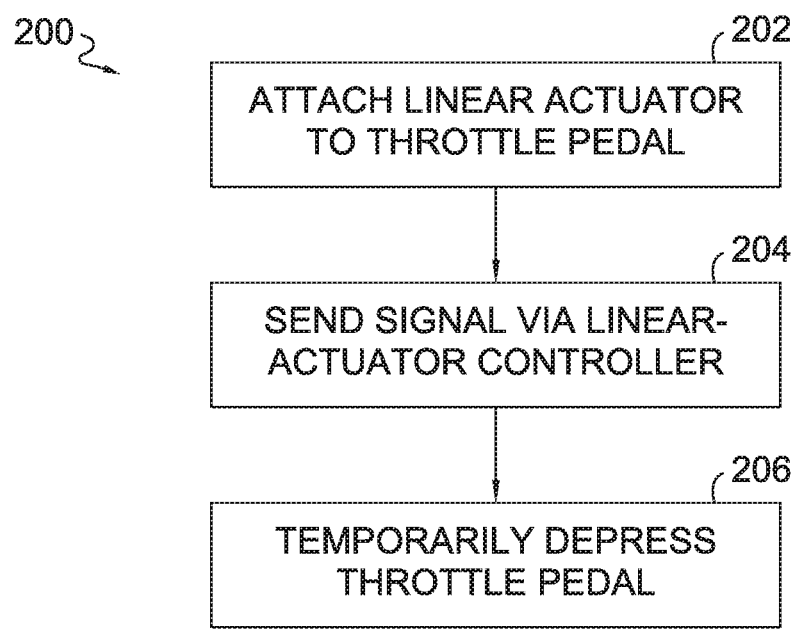
FIG. 2 depicts a flow chart showing some steps that might be carried out in performing a method of revving a vehicle in accordance with an aspect hereof.

Other aspects of this disclosure are directed to a method of revving a vehicle. Referring to FIG. 2 some steps are identified that might be carried out in accordance with a method 200 of revving a vehicle. Step 202 includes attaching a linear actuator to a throttle pedal of a vehicle. For example, the throttle-pedal connector 112 might be attached to the throttle pedal 100 in order to attach the linear actuator 114 to the throttle pedal 100. As previously explained the linear actuator is operable to move back and forth between a retracted state and an extended state and is in communication with a linear-actuator controller (e.g., elements 118 and 130). At step 204, a signal is sent by way of the linear-actuator controller. For example, a signal may be sent to the solenoid 118 when a human operator activates a switch or when the programmable controller sends an activation signal according to a programmed interval. In response to the signal, step 206 includes temporarily depressing the throttle pedal by moving the linear actuator from the retracted state to the extended state and back to the retracted state.

The method 200 might be carried out in various manners. For example, temporarily depressing 206 may include causing the linear actuator to travel a distance in a range of about 0.25 inches to about 6 inches from the retracted state to the extended state. In a further aspect, temporarily depressing 206 may include causing the linear actuator to move from the retracted state to the extended state nearly instantaneously. The rate at which the linear actuator moves from the retracted state to the extended state may vary, in in one aspect, the rate is about 0.25 inches per 0.10 seconds. Further still, temporarily depressing 206 might include causing the linear actuator to move from the retracted state to the extended state and back to the retracted state in a time duration in a range of about 0.10 seconds to about 1.0 seconds. These distances, rates, and times are merely examples of some aspects of this subject matter, and other aspects may include numerical values that are lower or higher than these examples.

In other aspects, the method might also include a compensation step for adjusting to a vehicle's responsiveness. For example, sending the signal in step 204 might include sending an electrical current from the linear-actuator controller (e.g., 130) to a solenoid 118, and the solenoid opens a valve permitting pressurized air to flow to the linear actuator. Prior to sending this initial signal, a computing device might execute an interval timer that specifies an interval duration, and the signal may be transmitted upon expiration of the interval duration. In order to compensate, the programmable controller 130 might receive a data input (e.g., key metrics of vehicle performance such as RPM, temperature, current gear, run time, etc.) from the vehicle-diagnostics system, and edit the interval duration based on the data input to create an updated interval duration. Upon expiration of the updated interval duration, another signal is sent causing the throttle pedal to be temporarily depressed after the timer has been updated to adjust for vehicle responsiveness. For example, the initial interval duration in which the pedal is depressed might cause the vehicle's engine RPM to rise above, or fall below, a threshold target RPM. In that example, the controller would capture the max RPM achieved during the last engine rev and increase that interval if the max RPM had risen above the threshold target RPM, or shorten the interval if the max RMP had fallen below the threshold target RPM.

Figure 3:
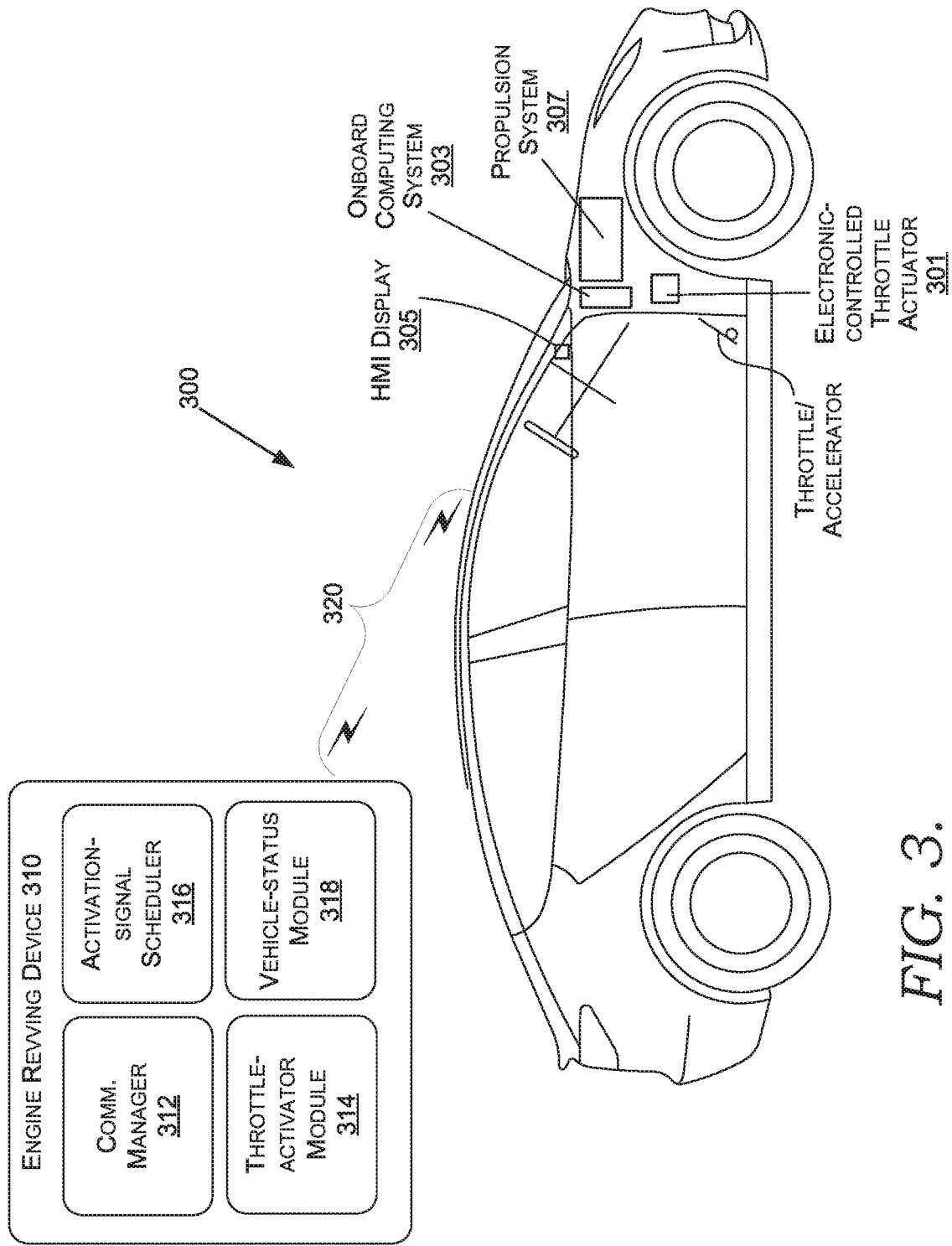
FIG. 3 depicts an example engine revving device that activates an electronic-controlled throttle actuator in accordance with an aspect of this disclosure.

FIGS. 1 and 2 relate to one type of engine revving device that depresses the pedal 100 in order to rev the engine. Referring now to FIG. 3, FIG. 3 illustrates another aspect of the present disclosure, including an engine revving device 310 that uses the vehicle's own input and output controls to rev the engine. That is, a vehicle 300 may be equipped with an electronic-controlled throttle actuator 301 controlled by one or more computing devices of the vehicle (e.g., onboard computing system 303 with processor(s), systems on chip (SoC), graphical processing units (GPUs), etc.). As such, the engine revving device 310 may electronically communicate (reference numeral 320 represents a hard-wired or wireless connection) with the electronic-controlled throttle actuator 301 to rev the engine. In one aspect, the engine revving device 310 is an external computing device that connects to the vehicle computing system by way of a port (e.g. an OBD 2 port) or other vehicle interface. This device could also be used in conjunction with Bluetooth software and have telemetric capabilities to upload service history and VIN numbers for storage. In another aspect, the engine revving device 310 may be an integrated computing module that is stored onboard the vehicle 301 and is usable through a graphical user interface of the vehicle (e.g., through the HMI display 305).

In this embodiment, in which the engine revving device 301 communicates with the electronic-controlled throttle actuator 301, the engine revving device 301 may include a communications manager 312, a throttle-activator module 314, an activation-signal scheduler 316, and a vehicle-status module 318. In some instances, one or more of the components of the engine revving device 310 may operate similar to the programmable controller 130. The engine revving device 310 includes the communications manager 312 configured to manage communications received by the engine revving device 310 (e.g., comprising vehicle data from the onboard computing system 303 of the vehicle 300) and/or provided by the engine revving device 310 (e.g., comprising throttle activation signals communicated to the vehicle 300). Additionally or alternatively, the communications manager 312 may manage communications within the engine revving device 310, such as between any of the throttle-activator module 314, the activation-signal scheduler 316, the vehicle-status module 318, and/or other components that may be included in the engine revving device 310 or may communicate with the engine revving device 310, (e.g., networked components that monitor or control other operations of the vehicle 300 or the engine revving device 310).

The engine revving device 310 may execute various operations when revving a vehicle. As an initial step, the engine revving device 310 may establish a connection with the electronic-controlled throttle actuator 301 (e.g., via the onboard computing system 303). For example, where the engine revving device 310 is onboard the vehicle 300, the communications manager 312 may send a signal to the onboard computing system 303 and the electronic-controlled throttle actuator 301 using a data bus or other communications network. In other instances, such as where the engine revving device 310 is external to the vehicle 300, the engine revving device 310 may include a plug (e.g., OBD 2 plug) or other electrical connector that inserts into a port of the vehicle to enable the communications manager 312 to exchange signals with the onboard computing system 303 and the electronic-controlled throttle actuator 301. Once a connection is established, the throttle-activator module 314 may send a signal to the electronic-controlled throttle actuator 301 to activate the propulsion system 307. For example, the throttle-activator module 314 may send one or more signals based on a predetermined schedule of intervals stored in the activation-signal scheduler 316 (e.g., every 45 seconds for 20 minutes). In addition, the vehicle-status module 318 may receive signals from the onboard computing system 303 providing information describing a status of one or more systems of the vehicle 300 (e.g., engine temperature, RPM, catalytic converter temperature, etc.). In response to the signals, the vehicle-status module 318 may adjust the predetermined schedule of intervals to create a modified schedule of intervals (e.g., to increase or decrease the frequency of activation signals sent by the throttle-activator module 314 to the electronic-controlled throttle activator 301).

Figure 4:
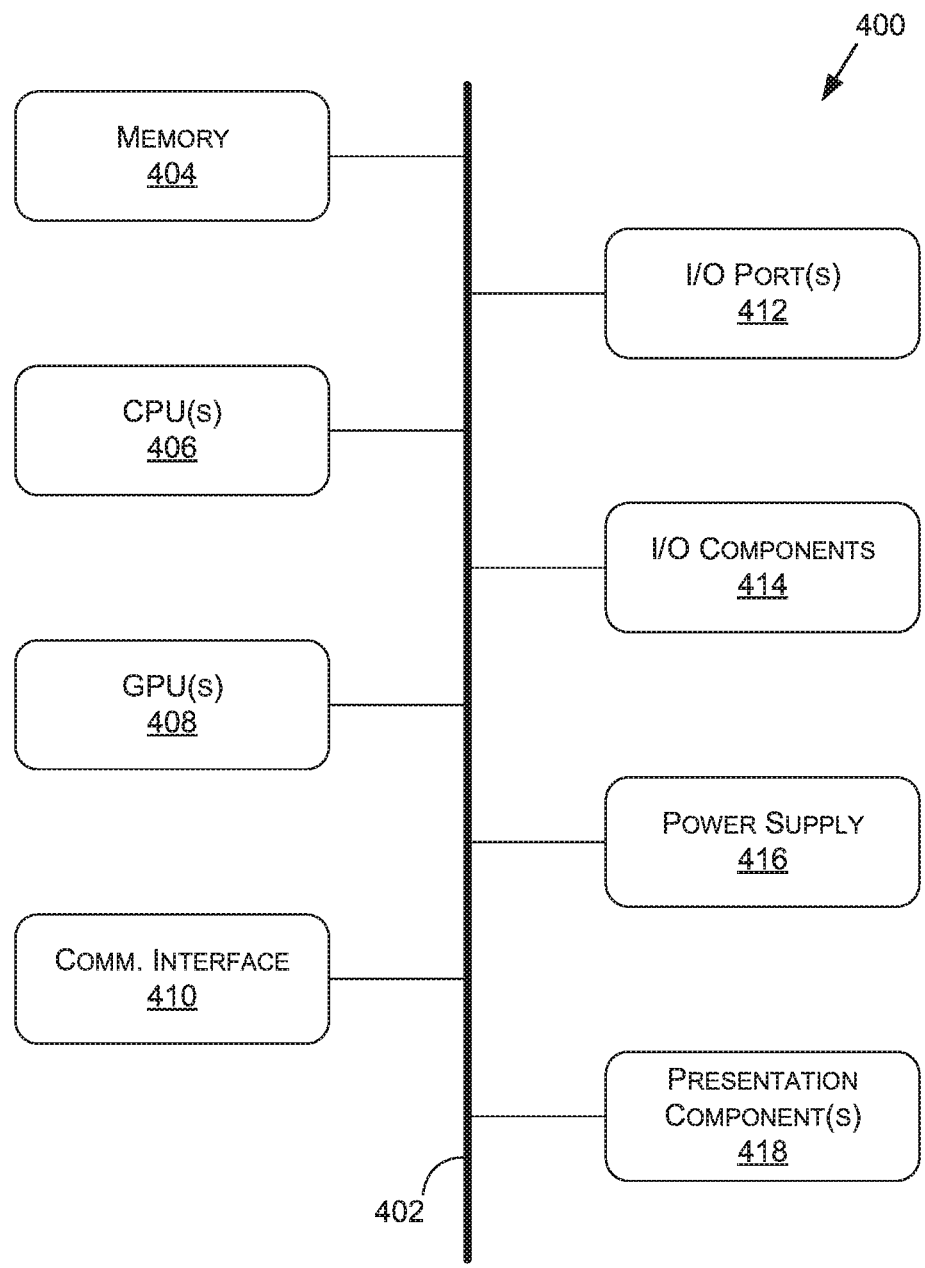
FIG. 4 depicts an example computing device that might include one or more components of an engine revving device in accordance with an aspect of this disclosure.

FIG. 4 is a block diagram of an example computing device 400 suitable for use in implementing some embodiments of the present disclosure, such as the engine revving device 310 or the onboard computing system 303. Computing device 400 may include a bus 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, and one or more presentation components 418 (e.g., display(s)).

Although the various blocks of FIG. 4 are shown as connected via the bus 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The bus 402 may represent one or more busses, such as an address bus, a data bus, a control bus, or a combination thereof. The bus 402 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system). Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 406 may be configured to execute the computer-readable instructions to control one or more components of the computing device 400 to perform one or more of the methods and/or processes (e.g., processes in FIG. 2 and as described with respect to FIG. 3) described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an ARM processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

The GPU(s) 408 may be used by the computing device 400 to render graphics (e.g., 3D graphics). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data. The display memory may be included as part of the memory 404. The GPU(s) 408 may include two or more GPUs operating in parallel (e.g., via a link). When combined together, each GPU 408 may generate pixel data for different portions of an output image or for different output images (e.g., a first GPU for a first image and a second GPU for a second image). Each GPU may include its own memory, or may share memory with other GPUs.

In examples where the computing device 400 does not include the GPU(s) 408, the CPU(s) 406 may be used to render graphics.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

From the foregoing, it will be seen that this subject matter is well adapted to attain all the ends and objects hereinabove set forth together with other advantages, which are obvious and which are inherent to the structure. It will be understood that certain features and subcombinations are of utility and might be employed without reference to other features and subcombinations. This is contemplated by and is within the scope of the claims. Since many possible alternative versions of the subjected matter might be made without departing from the scope thereof, it is to be understood that all matter herein set forth or shown in the accompanying drawings is to be interpreted as illustrative and not in a limiting sense.

The invention claimed is:

1. A throttle depressor for automatically revving a motorized vehicle, the throttle depressor comprising:
   a throttle-pedal connector;
   a linear actuator coupled with the throttle-pedal connector and operable to transition back and forth between a retracted state and an extended state;
   a throttle-depressor base coupled to the linear actuator and configured to fix a position of the throttle depressor, such that the throttle-pedal connector is moved more than the throttle-depressor base during transition of the linear actuator;
   a length adjuster configured to adjust a distance between the throttle-depressor base and the linear actuator; and
   a linear-actuator controller coupled to the linear actuator, wherein:
      the linear-actuator controller includes a programmable timer that triggers transition of the linear actuator at one or more set intervals between the retracted state and the extended state; and
      the programmable timer is configurable, based on an RPM received as an input from the motorized vehicle, to increase or decrease a duration associated with the one or more set intervals.

2. The throttle depressor of claim 1, wherein the throttle-pedal connector includes an adjustable clamp.

3. The throttle depressor of claim 1, wherein the throttle-pedal connector comprises an adjustable strap.

4. The throttle depressor of claim 1, wherein the throttle-pedal connector comprises a treaded surface that faces towards the direction in which the linear actuator moves when transitioning to an extended state and that is configured to mechanically adhere to a throttle pedal.

5. The throttle depressor of claim 1, wherein the linear actuator comprises a pneumatic cylinder.

6. The throttle depressor of claim 5, wherein the linear-actuator controller comprises a solenoid.

7. The throttle depressor of claim 1, wherein the throttle-depressor base releasably attaches to a portion of a vehicle.

8. The throttle depressor of claim 7, wherein the throttle-depressor base comprises an adjustable clamp.

9. The throttle depressor of claim 8, wherein the adjustable clamp is configured to releasably attach to a portion of a vehicle.

10. The throttle depressor of claim 1, wherein the length adjuster comprises a worm drive engaging the throttle-depressor base.

11. The throttle depressor of claim 1, wherein the linear-actuator controller comprises an OBD2 connector.

12. The throttle depressor of claim 11, wherein the linear-actuator controller comprises a computing device having a processor configured to communicate with a motor-vehicle diagnostics system.

13. The throttle depressor of claim 12, wherein the processor is configured to receive input data from the motor-vehicle diagnostics system.

14. The throttle depressor of claim 13, wherein the processor is configured to automatically adjust the one or more set intervals in response to receiving the input data.

15. The throttle depressor of claim 14, wherein the input data includes RPM, temperature, current gear, run time, or any and all combinations thereof.

16. The throttle depressor of claim 14, wherein adjusting the one or more set intervals includes:
   increasing, based on the RPM exceeding a threshold, a time duration between successive extension-retraction cycles of the linear actuator; or
   decreasing, based on the RPM being below the threshold, the time duration between successive extension-retraction cycles of the linear actuator.

17. An engine revving device comprising:
   a communications manager to exchange signals with an onboard computing system of a vehicle having an electronic-controlled throttle actuator;
   a throttle-activator module to send an activation signal by way of the communications interface to the electronic-controlled throttle actuator;
   an activation-signal scheduler storing a predetermined schedule of intervals at which a signal is to be sent by the throttle-activator module; and
   a vehicle-status module to receive signals from the onboard computing system indicating a vehicle status and adjust the predetermined schedule of intervals to a modified schedule of intervals based on the vehicle status, wherein the vehicle-status module adjusts the predetermined schedule by, based on one or more of RPM, temperature, current gear, or run time, either increasing or decreasing a time duration between successive extension-retraction cycles of the electronic-controlled linear actuator.

18. A method of revving a vehicle via a linear actuator that is attached to a throttle pedal of the vehicle, that is operable to move back and forth between a retracted state and an extended state, and that is in communication with a linear-actuator controller, the method comprising:
   sending, upon expiration of an interval duration, a signal via the linear-actuator controller;
   in response to the signal, temporarily depressing the throttle pedal by moving the linear actuator from the retracted state to the extended state and back to the retracted state;
   receiving a data input from a vehicle-diagnostics systems, the data input indicating an RPM of the vehicle;
   editing, based on the RPM of the vehicle, the interval to create an updated interval duration, wherein the updated interval duration is, based on the RPM exceeding a threshold target RPM, longer than the interval duration; and
   upon expiration of the updated interval duration, sending another signal causing the throttle pedal to be temporarily depressed.

* * * * *